(12) United States Patent
Fukano et al.

(10) Patent No.: US 11,013,170 B2
(45) Date of Patent: May 25, 2021

(54) POWER EQUIPMENT

(71) Applicant: HONDA MOTOR CO., LTD., Tokyo (JP)

(72) Inventors: Jun Fukano, Wako (JP); Masato Takeda, Wako (JP); Keisuke Muraoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 16/342,118

(22) PCT Filed: Nov. 16, 2017

(86) PCT No.: PCT/JP2017/041320
§ 371 (c)(1),
(2) Date: Apr. 15, 2019

(87) PCT Pub. No.: WO2018/097032
PCT Pub. Date: May 31, 2018

(65) Prior Publication Data
US 2019/0269067 A1   Sep. 5, 2019

(30) Foreign Application Priority Data

Nov. 25, 2016   (JP) .............................. JP2016-229546

(51) Int. Cl.
*A01D 34/76*   (2006.01)
*A01D 34/00*   (2006.01)
(Continued)

(52) U.S. Cl.
CPC ........... *A01D 34/006* (2013.01); *A01D 34/67* (2013.01); *A01D 34/6806* (2013.01);
(Continued)

(58) Field of Classification Search
CPC .. A01D 34/006; A01D 34/6806; A01D 34/81; A01D 34/76; A01D 34/78; A01D 34/828; A01D 75/28; A01D 34/86
See application file for complete search history.

(56) References Cited

U.S. PATENT DOCUMENTS 8,275,516 B2 * 9/2012 Murphy ............... B60W 40/112
                                                    701/38
8,862,311 B2   10/2014 Cho et al.
(Continued)

FOREIGN PATENT DOCUMENTS

DE   19941104 A1   3/2001
JP   H0943269 A    2/1997
(Continued)

OTHER PUBLICATIONS

English translation of International Search Report for International Application No. PCT/JP2017/041320, dated Feb. 13, 2018, 2 pages.
(Continued)

*Primary Examiner* — Thomas B Will
*Assistant Examiner* — Madeline Ivy Runco
(74) *Attorney, Agent, or Firm* — Armstrong Teasdale LLP (57) ABSTRACT

To properly determine a state in which driving of the work unit should be prohibited in power equipment, the power equipment (1) includes: a main body (2); a work unit provided on the main body; a work motor (8) that drives the work unit; a tilt angle detector (41) that detects a tilt angle of the main body; and a control unit (10) that drive-controls the work motor, wherein the control unit performs prohibition control to prohibit driving of the work motor when the tilt angle becomes greater than or equal to a predetermined tilt angle determination value and a change rate of the tilt angle becomes greater than or equal to a predetermined change rate determination value.

7 Claims, 7 Drawing Sheets

(51) Int. Cl.
*A01D 34/68* (2006.01)
*A01D 34/69* (2006.01)
*A01D 34/78* (2006.01)
*A01D 34/86* (2006.01)
*A01D 34/67* (2006.01)
*A01D 101/00* (2006.01)

(52) U.S. Cl.
CPC ............ *A01D 34/69* (2013.01); *A01D 34/76* (2013.01); *A01D 34/78* (2013.01); *A01D 34/86* (2013.01); *A01D 2101/00* (2013.01)

(56) References Cited

U.S. PATENT DOCUMENTS

| | | | |
|---|---|---|---|
| 9,459,097 B2* | 10/2016 | Davey | .................... A01D 75/28 |
| 2005/0080544 A1 | 4/2005 | Suzuki et al. | |
| 2005/0209757 A1 | 9/2005 | Kueblbeck et al. | |
| 2006/0241833 A1 | 10/2006 | Yasui et al. | |
| 2008/0018269 A1* | 1/2008 | Wyatt | .................. B62D 5/0418 |
| | | | 318/53 |
| 2009/0025998 A1 | 1/2009 | Brandmeier et al. | |
| 2010/0294616 A1* | 11/2010 | Osawa | ................. A01D 34/828 |
| | | | 192/129 R |
| 2012/0159916 A1* | 6/2012 | Ishii | ........................ B60L 58/40 |
| | | | 56/10.2 A |

FOREIGN PATENT DOCUMENTS

| | | |
|---|---|---|
| JP | H10289639 A | 10/1998 |
| JP | 2006220491 A | 8/2006 |
| JP | 2013238097 A | 11/2013 |
| JP | 2014025912 A | 2/2014 |
| JP | 2016195546 A | 11/2016 |
| WO | 2016104187 A1 | 10/2017 |

OTHER PUBLICATIONS

Extended European Search Report for EP Application No. 17873046.1, dated Nov. 11, 2019, 7 pages.

* cited by examiner

POWER EQUIPMENT

CROSS-REFERENCE TO RELATED APPLICATIONS

This application is a U.S. National Phase Application of PCT/JP2017/041320, filed Nov. 16, 2017, which claims the benefit of priority to JP Application No. 2016229546, filed Nov. 25, 2016, the contents of which are hereby expressly incorporated by reference in their entirety.

TECHNICAL FIELD

The present invention relates to power equipment provided with wheels and a blade, such as lawn mowers, grass cutters, snow blowers, tillers, etc.

BACKGROUND ART

A lawn mower provided with a switch device that operates based on a tilt state of a main body to prohibit rotation of a blade when the lawn mower topples over is known (for example, see Patent Document 1). The switch device is provided on the main body of the lawn mower, and includes a case containing a ball therein such that the ball is movable, a conical recess formed in the bottom surface of the case, and a press switch provided at the bottom of the recess. When the main body of the lawn mower is in a horizontal position, the ball is held in the recess and the switch is pressed by the ball. On the other hand, when the main body of the lawn mower is tilted, the ball moves out of the recess due to gravity and the switch is released.

PRIOR ART DOCUMENT(S)

Patent Document(s)

Patent Document 1: JPH10-289639A

SUMMARY OF THE INVENTION

Task to be Accomplished by the Invention

However, the switch device of the lawn mower of the aforementioned Patent Document 1 only detects whether a predetermined tilt angle is exceeded simply based on the contact and separation between the ball and the press switch. As a result, there is a problem that when the lawn mower is in an arbitrary tilt angle, it is not possible to distinguish between a state in which the lawn mower is intentionally turned over for maintenance and a state in which the lawn mower is tilted as a result of gradual sloping of the ground during operation.

In view of the above background, an object of the present invention is to properly determine a state in which driving of the work unit should be prohibited in power equipment.

Means to Accomplish the Task

To achieve the above object, one embodiment of the present invention provides power equipment, comprising: a main body; a work unit provided on the main body; a work motor that drives the work unit; a tilt angle detection means that detects a tilt angle of the main body; and a control unit that drive-controls the work motor, wherein the control unit performs prohibition control that prohibits driving of the work motor when the tilt angle becomes greater than or equal to a predetermined tilt angle determination value and a change rate of the tilt angle becomes greater than or equal to a predetermined change rate determination value.

According to this arrangement, when it is determined whether the power equipment is in a state in which the driving of the work unit should be prohibited, it is possible to take into account the background when the main body is placed into the tilted state because not only the tilt angle but also the change rate of the tilt angle is taken into account. For instance, when the ground slopes gradually during lawn mowing, the change rate of the tilt angle of the main body is small, and the prohibition control is not performed. On the other hand, when the main body is turned over for maintenance or the main body unexpectedly topples over, the change rate of the tilt angle of the main body is large, and the prohibition control is performed.

Further, in the above arrangement, preferably, the tilt angle detection means is an acceleration sensor that outputs a signal corresponding to an acceleration, and the control unit performs low-pass filtering process on the signal from the acceleration sensor to remove at least a portion of the signal corresponding to a dynamic component of the acceleration, and calculates the tilt angle based on the signal that has been subjected to the filtering process.

According to this arrangement, the tilt angle detection means can be made compact and simple.

Further, in the above arrangement, preferably, the power equipment comprises: a travel motor that drives a wheel provided on the main body; and an operation input means that inputs a signal corresponding to an operation by an operator to the control unit, wherein the control unit drive-controls the travel motor according to the signal from the operation input means, and changes a filter used in the low-pass filtering process according to the signal from the operation input means.

According to this arrangement, when it is determined based on the operation signal from the operation input means that the travel motor is under acceleration or deceleration and a fore-and-aft acceleration is generated in the main body, the filter is changed such that the dynamic component of the acceleration detected by the acceleration sensor is removed even more reliably.

Further, in the above arrangement, preferably, the control unit increases a removal ratio of a high-frequency component of the signal from the acceleration sensor by changing the filter when acceleration or deceleration of the travel motor is determined based on the signal from the operation input means.

According to this arrangement, when it is determined that the travel motor is under acceleration or deceleration and a fore-and-aft acceleration is generated in the main body, the dynamic component of the acceleration detected by the acceleration sensor is removed even more reliably.

Further, in the above arrangement, preferably, the control unit terminates the prohibition control and permits driving of the work motor when the tilt angle becomes smaller than or equal to a restoration determination value that is set to a predetermined value smaller than or equal to the tilt angle determination value.

According to this arrangement, when the tilt angle of the main body is returned to the predetermined horizontal position, it becomes possible to drive the work unit.

Further, in the above arrangement, preferably, the power equipment further comprises a restoration operation input means that inputs a signal corresponding to an operation by an operator to the control unit, wherein the control unit terminates the prohibition control and permits driving of the work motor when the control unit receives a signal from the restoration operation input means during the prohibition control.

According to this arrangement, the prohibition control is continued until restoration operation input means is operated by the operator, and therefore, inadvertent driving of the work unit is prevented when the main body is returned to the horizontal position.

Further, in the above arrangement, preferably, the power equipment further comprises a restoration operation input means that inputs a signal corresponding to an operation by an operator to the control unit, wherein the control unit terminates the prohibition control and permits driving of the work motor when the tilt angle becomes smaller than or equal to a restoration determination value that is set to a predetermined value smaller than or equal to the tilt angle determination value and the control unit receives a signal from the restoration operation input means during the prohibition control.

According to this arrangement, the prohibition control is continued until the tilt angle of the main body is returned to the predetermined horizontal position and the restoration operation input means is operated by the operator, and therefore, inadvertent driving of the work unit is prevented when the main body is returned to the horizontal position.

Further, in the above arrangement, preferably, the work unit includes a lawn mowing blade rotated by the work motor.

Effect of the Invention

According to the foregoing arrangement, it is possible to properly determine a state in which driving of the work unit should be prohibited in power equipment power equipment.

MODES FOR CARRYING OUT THE INVENTION

In the following, an embodiment in which power equipment according to the present invention is applied to an electric lawn mower will be described with reference to FIGS. 1 to 6.

(Outline of Structure of Electric Lawn Mower)

Figure 1:
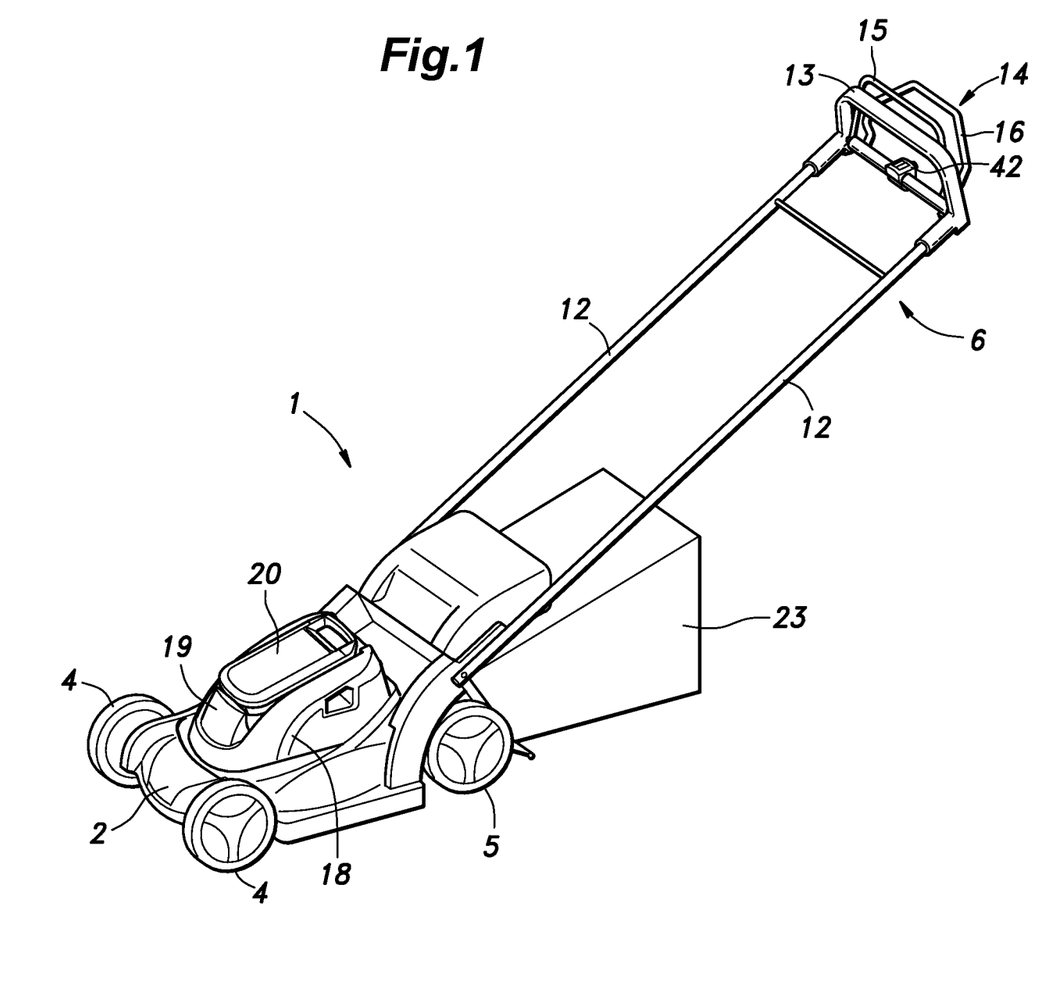
FIG. 1 is a perspective view of an electric lawn mower according to an embodiment.
Figure 2:
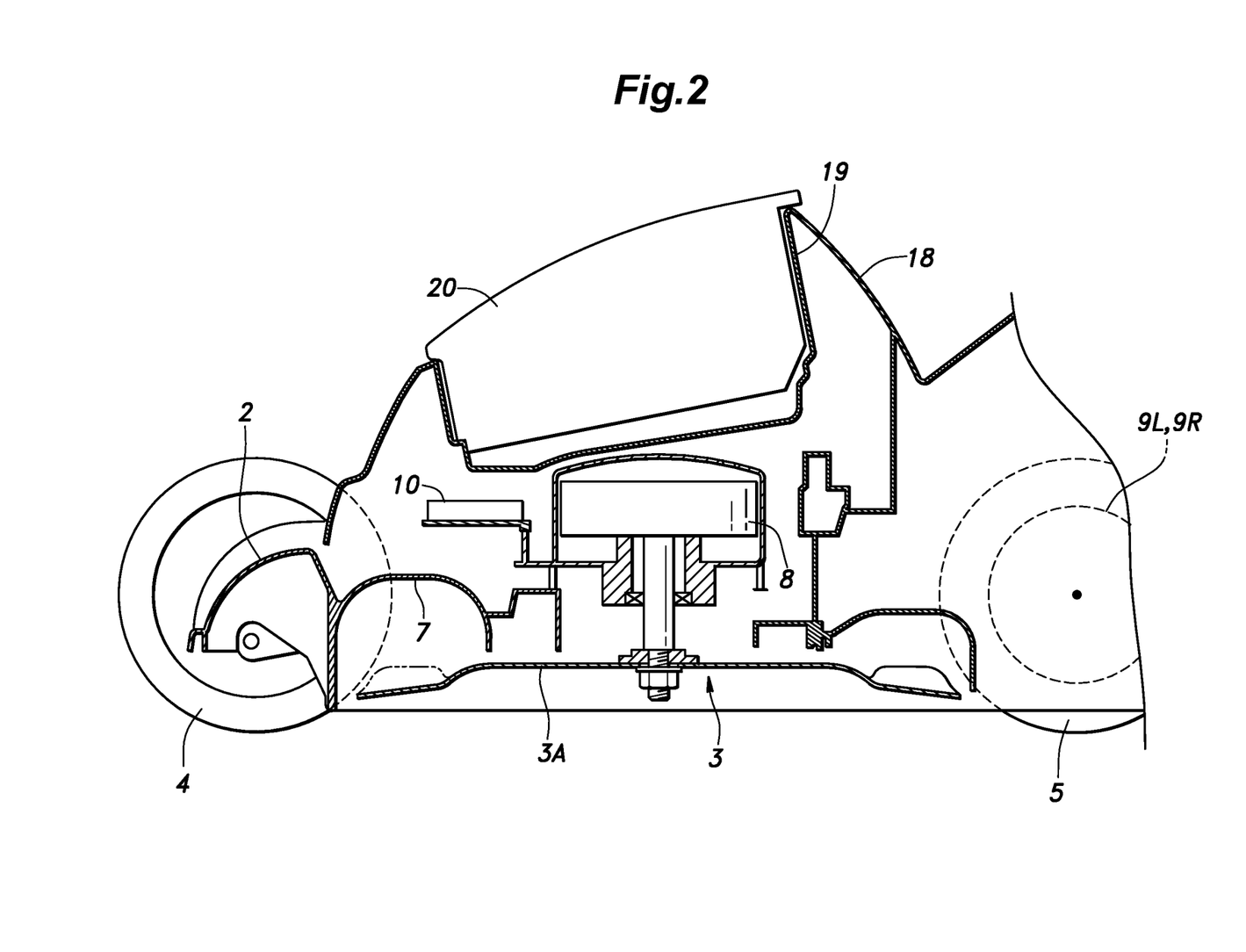
FIG. 2 is a sectional view of the electric lawn mower according to the embodiment.

As shown in FIGS. 1 and 2, an electric lawn mower 1 according to the present embodiment includes a main body 2, a work unit 3 provided in a lower part of the main body 2, a pair of left and right front wheels 4 and a pair of left and right rear wheels 5 rotatably supported on the main body 2, and a handle 6 extending rearward and upward from the main body 2. The work unit 3 is provided with a recess 7 that opens out downward at the center of the lower part of the main body 2 and a blade 3A that is rotatably disposed in the recess 7 and serves as a lawn mowing blade. Supported on the main body 2 are a work motor 8 having a rotation output shaft coupled to the blade 3A and a pair of left and right travel motors 9L and 9R for driving the left and right rear wheels 5, respectively. The work motor 8 and the travel motors 9L and 9R are electric motors, and the main body 2 is provided with a control unit 10 for controlling the motors 8, 9L and 9R.

The handle 6 includes a pair of side bars 12 extending upward and rearward from either side of a rear part of the main body 2 and a frame-shaped grip 13 connecting the rear ends of the side bars 12 to each other. The grip 13 of the handle 6 is provided with an operation input unit 14 for receiving an input operation by an operator. The operation input unit 14 is provided with a travel lever 15 for operating the travel motors 9L and 9R and a work lever 16 for operating the work motor 8.

The upper part of the main body 2 is provided with an upper cover 18 that covers the work motor 8, the left and right travel motors 9L and 9R, and the control unit 10. A battery 20 for supplying electric power to the motors 8 and 9 and the control unit 10 is detachably received in a battery tray 19 formed by recessing the upper surface of the upper cover 18.

The main body 2 is formed with a passage (not shown) extending from the recess 7 to the rear side of the main body 2, and a grass bag 23 is provided to close an open end of the passage. The grass cut by the blade 3A is discharged from the recess 7 to the rear through the passage, and collected in the grass bag 23.

(Control Unit)

Figure 3:
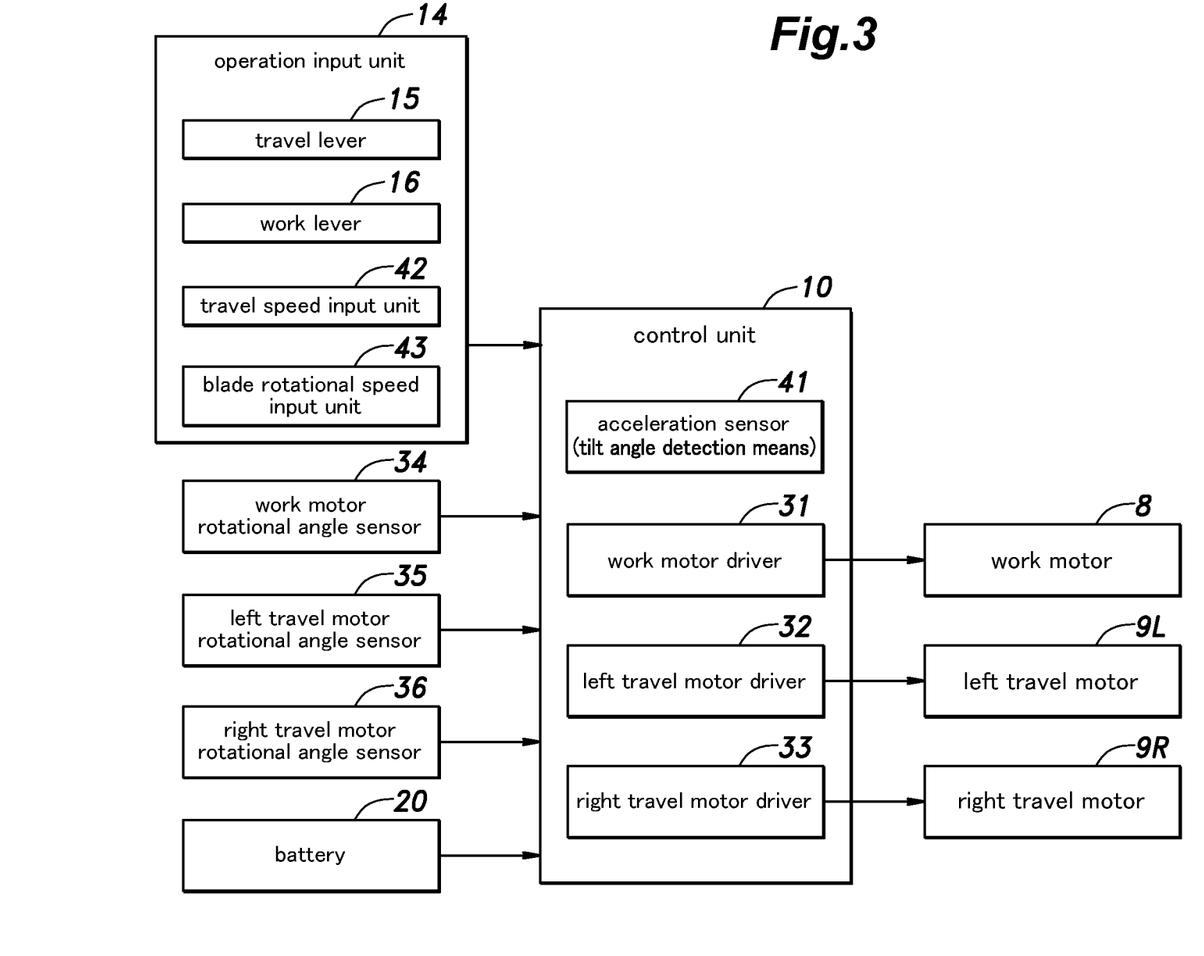
FIG. 3 is a block diagram showing a structure of a control unit.

The control unit 10 consists of an electronic control circuit (ECU) constituted of a microcomputer, ROM, RAM, a peripheral circuit, an input/output interface, drivers and the like. As shown in FIG. 3, the control unit 10 is connected to the battery 20 and receives power supply from the battery 20. The control unit 10 is provided with motor drivers 31, 32 and 33 corresponding to the work motor 8 and the left and right travel motors 9L and 9R, respectively. The control unit 10 causes the electric power to be supplied from the battery 20 to the motors 8, 9L and 9R via the motor drivers 31 to 33, and controls the motors 8, 9L and 9R. For instance, the control unit 10 changes the electric voltages provided to the motors 8, 9L and 9R by controlling the respective motor drivers 31, 32 and 33 according to PWM control, to thereby changes the rotational speeds of the motors 8, 9L and 9R.

The work motor 8 and the left and right travel motors 9L and 9R are provided with respective rotational angle sensors 34, 35 and 36 for detecting the rotational angles of the corresponding motors 8, 9L and 9R. The rotational angle sensors 34, 35 and 36 output signals corresponding to the rotational angles of the respective motors 8, 9L and 9R to the control unit 10, and the control unit 10 acquires the rotational speeds of the work motor 8 and the left and right travel motors 9L and 9R according to the signals.

The control unit 10 includes an acceleration sensor 41 serving as a tilt angle detection means. For instance, the acceleration sensor 41 is a semiconductor device formed on the board of the control unit 10, and is preferably formed using MEMS technology. The acceleration sensor 41 may be an acceleration sensor of capacitance type, piezoelectric type or the like. The acceleration sensor 41 is a 3-axis acceleration sensor that outputs signals corresponding to accelerations of the main body 2 in the fore and aft direction (X axis), the lateral direction (Y axis), and the vertical direction (Z axis). The signals output from the acceleration sensor 41 includes a low-frequency static component (DC acceleration) attributed to gravity acceleration and a high-frequency dynamic component (AC acceleration) attributed to movement of the main body 2.

The travel lever 15 and the work lever 16 are each pivotally attached to the handle 6 such that the grip of each lever is movable between an initial position where the grip is spaced from the grip 13 of the handle 6 and an operation position where the grip is located close to the grip 13 of the handle 6. The operation input unit 14 outputs a travel command signal corresponding to the position of the travel lever 15 to the control unit 10, and outputs a blade rotation command signal corresponding to the position of the work lever 16 to the control unit 10. The travel command signal has a value corresponding to 0% when the travel lever 15 is in the initial position and a value corresponding to 100% when the travel lever 15 is in the operation position, where the value of the travel command signal increases gradually from the initial position to the operation position. Similarly, the blade rotation command signal is a value corresponding to 0% when the work lever 16 is in the initial position and a value corresponding to 100% when the work lever 16 is in the operation position, where the value of the blade rotation command signal increases gradually from the initial position to the operation position.

The operation input unit 14 is provided with a travel speed input unit 42 for accepting an input operation by an operator regarding the travel speed of the electric lawn mower 1. The travel speed input unit 42 may consist of a lever, a dial, or the like that can be displaced with respect to the main body of the operation input unit 14, and the operation input unit 14 outputs a signal corresponding to the position of the travel speed input unit 42 to the control unit 10. Based on the signal from the operation input unit 14, the control unit 10 acquires a commanded rotational speed of the travel motors 9L and 9R corresponding to the travel speed desired by the operator.

The operation input unit 14 is provided with a blade rotational speed input unit 43 for accepting an input operation by the operator regarding the rotational speed of the blade 3A. The blade rotational speed input unit 43 may consist of a lever, a dial, a push button, or the like that can be displaced with respect to the main body of the operation input unit 14, and the operation input unit 14 outputs a signal corresponding to the position of the blade rotational speed input unit 43 to the control unit 10. Based on the signal from the operation input unit 14, the control unit 10 acquires a commanded rotational speed of the work motor 8 corresponding to the blade rotational speed desired by the operator.

Figure 4:
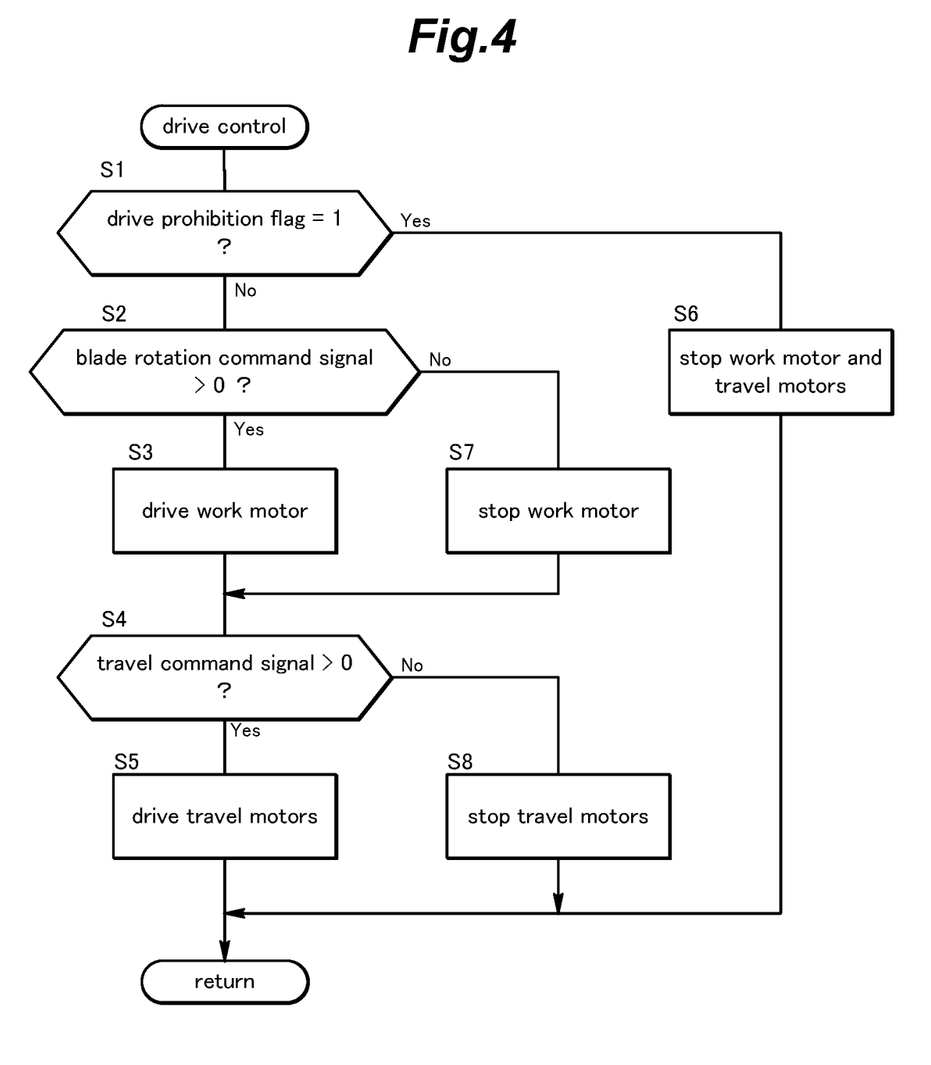
FIG. 4 is a flowchart showing a procedure of drive control performed by the control unit.

Next, with reference to FIGS. 4 to 6, description will be made of the control performed by the control unit 10. The control unit 10 performs drive control shown in FIG. 4, tilt angle calculation shown in FIG. 5, and prohibition state monitoring control shown in FIG. 6 in parallel. In the drive control shown in FIG. 4, the control unit 10 first determines in step S1 whether a later-described drive prohibition flag is 1. The drive prohibition flag is a flag having a value of 1 or 0 to indicate whether drive prohibition control is being performed, wherein 1 indicates that the prohibition control is being performed. If the drive prohibition flag is 1, the control flow proceeds to step S6, where the work motor 8 and the travel motors 9L and 9R are stopped, and then proceeds to the return step.

If the drive prohibition flag is 0 (the drive prohibition control is not being performed), the control unit 10 determines in step S2 whether the value of the blade rotation command signal is greater than 0%. If the value of the blade rotation command signal is greater than 0% (the blade rotation command signal is ON), the control unit 10 proceeds to step 3 where the control unit 10 calculates a target rotational speed of the work motor 8 based on the blade rotation command signal and the commanded rotational speed of the work motor 8, and controls the work motor driver 31 based on the target rotational speed of the work motor 8 to thereby drive the work motor 8. For instance, the target rotational speed of the work motor 8 may be preferably calculated by multiplying the commanded rotational speed of the work motor 8 by the value of the blade rotation command signal. The target rotational speed of the work motor 8 is equal to the commanded rotational speed of the work motor 8 when the value of the blade rotation command signal is 100%, and decreases as the value of the blade rotation command signal decreases. Based on the signal from the work motor rotational angle sensor 34, the control unit 10 performs feedback control such that the rotational speed of the work motor 8 coincides with the target rotational speed.

If it is determined in step S2 that the value of the blade rotation command signal is 0% (the blade rotation command signal is OFF), the control unit 10 proceeds to step S7 to stop the work motor 8.

In step S4 that follows step S3 or S7, the control unit 10 determines whether the value of the travel command signal is greater than 0%. If the value of the travel command signal is greater than 0% (the travel command signal is ON), the control unit 10 proceeds to step S5 where the control unit 10 calculates the target rotational speed of the travel motors 9L and 9R based on the travel command signal and the commanded rotational speed of the travel motors 9L and 9R, and controls the travel motor drivers 32 and 33 based on the target rotational speed of the travel motors 9L and 9R to thereby drive the travel motors 9L and 9R. For instance, the target rotational speed of the travel motors 9L and 9R may be preferably calculated by multiplying the commanded rotational speed of the travel motors 9L and 9R by the value of the travel command signal. The target rotational speed of the travel motors 9L and 9R is equal to the commanded rotational speed of the travel motors 9L and 9R when the value of the travel command signal is 100%, and decreases as the value of the travel command signal decreases. Based on the signals from the travel motor rotational angle sensors 35 and 36, the control unit 10 performs feedback control such that the rotational speed of the travel motors 9L and 9R coincides with the target rotational speed.

If it is determined in step S4 that the value of the travel command signal is 0% (the travel command signal is OFF), the control unit 10 proceeds to step S8 to stop the travel motors 9L and 9R, and then proceeds to the return step.

Figure 5:
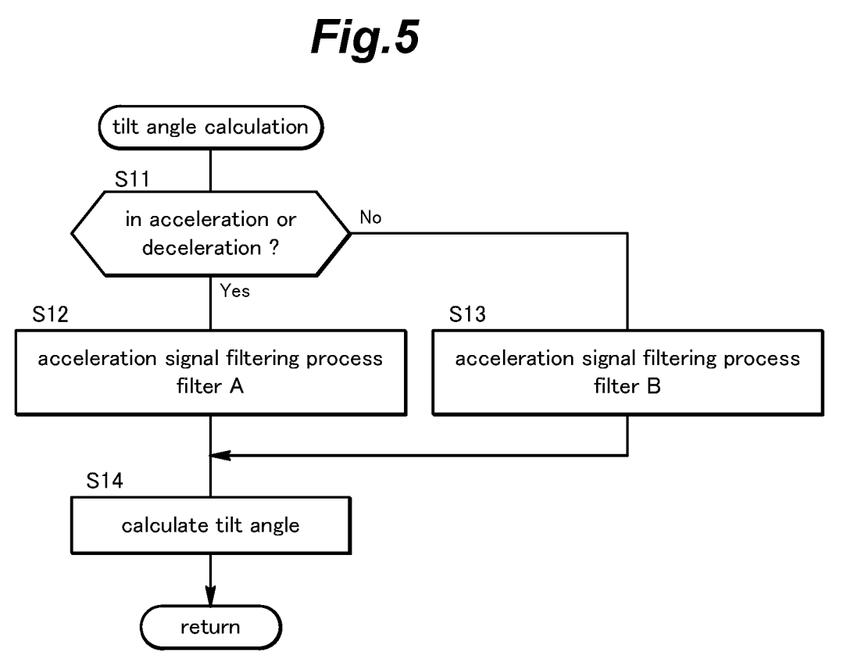
FIG. 5 is a flowchart showing a procedure of tilt angle calculation performed by the control unit.

In the tilt angle calculation shown in FIG. 5, the control unit 10 first determines whether or not the travel motors 9L and 9R are in acceleration or deceleration (step S11). In the present embodiment, the control unit 10 performs the determination in step S11 based on the value of the travel command signal. Specifically, the control unit 10 determines whether it is in a predetermined period from detection of an increase or decrease of the value of the travel command signal. In the aforementioned step S5, the rotational speed of the travel motors 9L and 9R is controlled based on the value of the travel command signal, and therefore, it can be determined that the travel motors 9L and 9R are in acceleration or deceleration during the predetermined period from an increase or decrease of the value of the travel command signal.

If it is determined in step S11 that the main body 2 is in acceleration or deceleration (Yes), the control unit 10 performs a low-pass filtering process on the signal from the acceleration sensor 41 by use of a low-pass filter A in step S12, and if it is determined in step S11 that the main body 2 is not in acceleration or deceleration (No), the control unit 10 performs a low-pass filtering process on the signal from the acceleration sensor 41 by use of a low-pass filter B in step S13. The control unit 10 may perform a moving average process the signal from the acceleration sensor 41 before or after the low-pass filtering process in steps S12 and S13. Owing to the low-pass filtering process in steps S12 and S13, a part of the dynamic component of the acceleration, which is a high-frequency component, is removed from the signal from the acceleration sensor 41, so that the static component attributed to gravity is extracted. The low-pass filter A used in step S12 is designed to have a cutoff frequency lower than that of the low-pass filter B used in step S12, and hence has a higher removal ratio of the high-frequency component. Namely, by use of the low-pass filter A, the removal ratio of the dynamic component corresponding to the high-frequency component in the signal from the acceleration sensor 41 is increased compared to the case where the low-pass filter B is used, whereby the dynamic component of the acceleration attributed to travel of the main body 2 is removed even more reliably.

In step S14 that follows steps S12 and S13, based on the signal from the acceleration sensor 41 that has been subjected to the low-pass filtering process to extract the static component of the acceleration, the control unit 10 calculates at least one of a tilt angle of the main body 2 about the X axis (roll angle) and a tilt angle of the main body 2 about the Y axis (pitch angle). In the present embodiment, the control unit 10 calculates the roll angle as the tilt angle in step S14. For instance, the calculation of the tilt angle may be preferably performed by multiplying the value of the signal of the acceleration sensor 41 by a predetermined coefficient based on a relationship between the value of the signal of the acceleration sensor 41 and the tilt angle that has been confirmed beforehand. After performing the process in step S14, the control unit 10 proceeds to the return step and repeats the tilt angle calculation control.

Figure 6:
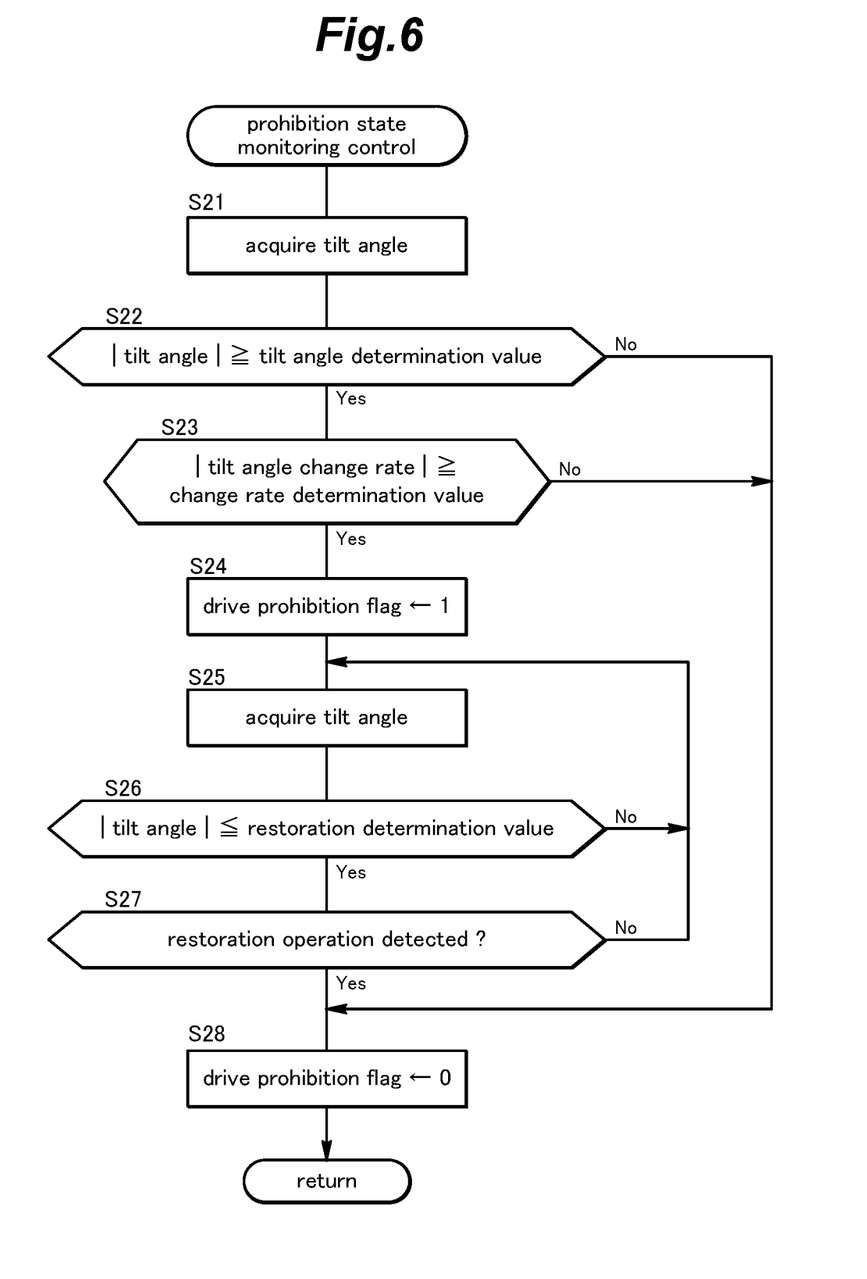
FIG. 6 is a flowchart showing a procedure of prohibition state monitoring control performed by the control unit.

In the prohibition state monitoring control shown in FIG. 6, in first step S21, the control unit 10 acquires the tilt angle calculated in the tilt angle calculation control. In subsequent step S22, the control unit 10 determines whether the absolute value of the tilt angle is greater than or equal to a predetermined tilt angle determination value. The tilt angle determination value is preferably set to 50-180 degrees, for example, corresponding to the maintenance state of the electric lawn mower 1.

If the determination result in step S22 is Yes, the control unit 10 determines in step S23 whether the absolute value of a change rate of the tilt angle is greater than or equal to a predetermined change rate determination value. The absolute value of the change rate of the tilt angle is relatively large when the main body 2 is intentionally turned over for maintenance or the main body 2 unexpectedly topples over, and is relatively small when the tilt angle changes gradually as a result of travel of the electric lawn mower 1 on the sloping ground, and the change rate determination value is set to allow them to be distinguished from each other. If the determination result in step S23 is Yes, the control unit 10 sets the drive prohibition flag to 1 in step S24, and if No, proceeds to step S28. The control unit 10 performs the aforementioned determination in step S1 regarding drive control based on the drive prohibition flag, and performs the drive prohibition control in step S6.

In step S25 that follows step S24, the control unit 10 acquires again the tilt angle calculated in the tilt angle calculation control to update the tilt angle. In step S26 that follows step S25, the control unit determines whether the absolute value of the tilt angle is smaller than or equal to a predetermined restoration determination value. The restoration determination value is preferably set to a value smaller than the tilt angle determination value; for example, 0-10 degrees. If the determination result in step S26 is No, the control unit 10 returns to step S25, and repeats the process of steps S25 and S26 until the determination result in step S26 becomes Yes.

If the determination result in step S26 is Yes, the control unit 10 determines in step S27 whether there is a restoration operation. In the present embodiment, moving the work lever 16 to the operation position side after the work lever 16 is returned to the initial position is set as the restoration operation. If the restoration operation is not detected in step S27 (No), the control unit 10 returns to step S25 and repeats the process of steps S25-S27 until the determination result in step S27 becomes Yes. Thus, the operation input unit 14 serves as a restoration operation input means for inputting a restoration operation.

If the determination result in step S22 is No, the determination result in step S23 is No, or the determination result in step S27 is Yes, the control unit 10 sets the drive prohibition flag to 0 in step S28, and the proceeds to the return step. Setting the drive prohibition flag to 0 causes the drive prohibition control to be terminated.

With the control unit 10 performing the control flow shown in FIGS. 4 to 6, the electric lawn mower 1 operates as follows. When the work lever 16 is moved to the operation position side or is turned on by the operator, the work motor 8 is driven and the blade 3A is rotated so that the electric lawn mower 1 can perform lawn mowing. When the work lever 16 is turned on and the travel lever 15 is moved to the operation position side or is turned on by the operator, the travel motors 9L and 9R are driven and the rear wheels 5 are rotated so that the electric lawn mower 1 can move forward.

The rotational speed of the travel motors 9L and 9R, which corresponds to the travel speed of the electric lawn mower 1, is determined by the commanded rotational speed of the travel motors 9L and 9R set by an operation of the travel speed input unit 42 by the operator and the position of the travel lever 15. When the operator operates the travel lever 15, the control unit 10 drive-controls the travel motors 9L and 9R to accelerate or decelerate the electric lawn mower 1 such that the rotational speed of the travel motors 9L and 9R corresponding to the position of the travel lever 15 is achieved. Similarly, the rotational speed of the work motor 8, which corresponds to the rotational speed of the blade 3A, is determined by the commanded rotational speed of the work motor 8 set by an operation of the blade rotational speed input unit 43 by the operator and the position of the work lever 16. When the operator operates the work lever 16, the control unit 10 drive-controls the work motor 8 to accelerate or decelerate the rotational speed of the blade 3A such that the rotational speed of the work motor 8 corresponding to the position of the work lever 16 is achieved.

The control unit 10 sets the drive prohibition flag to 1 when the tilt angle of the main body 2 of the electric lawn mower 1 calculated based on the detection signal from the acceleration sensor 41 is greater than or equal to the predetermined tilt angle determination value and the change rate of the tilt angle is greater than or equal to the predetermined change rate determination value (steps S22-S24). When the drive prohibition flag is 1, the control unit 10 causes the work motor 8 and the travel motors 9L and 9R to stop (step S1, S6). Thereby, in such cases as when the main body 2 is intentionally turned over for maintenance or when the main body 2 inadvertently topples over, driving of the work motor 8 and the travel motors 9L and 9R is stopped, and thus, the safety of the electric lawn mower 1 is improved. In such cases as when the tilt angle of the main body 2 gradually increases while the electric lawn mower 1 is operated on slopes, the change rate of the tilt angle does not become greater than or equal to the change rate determination value, and the drive prohibition flag is set to 0. Thus, the control unit 10 distinguishes turning over for maintenance and inadvertent toppling from tilting of the main body 2 during lawn mowing operation, and stops the work motor 8 and the travel motors 9L and 9R when appropriate.

If the drive prohibition flag becomes 1, the control unit 10 maintains the drive prohibition flag at 1 and continues the prohibition of driving of the work motor 8 and the travel motors 9L and 9R until the tilt angle becomes smaller than the restoration determination value and the restoration operation is detected (steps S25-S27). When the tilt angle becomes smaller than the restoration determination value and the restoration operation is detected, the control unit 10 sets the drive prohibition flag to 0, to permit the driving of the work motor 8 and the travel motors 9L and 9R (steps S25-28). Thereby, if the work motor 8 and the travel motors 9L and 9R are stopped due to toppling or the like of the main body 2, rotation of the work motor 8 and the travel motors 9L and 9R the main body 2 is permitted only after the main body 2 is returned to a normal upright position and the operator performs the restoration operation, and therefore, rotation of the work motor 8 and the travel motors 9L and 9R not intended by the operator is prevented, and safety is improved.

The control unit 10 determines acceleration or deceleration of the main body 2 in the fore and aft direction, and when it is in acceleration or deceleration, lowers the cutoff frequency of the filter used in the low-pass filtering process than when it is stopped or traveling at a constant speed (steps S11-S13). Thereby, the dynamic component in the acceleration detected by the acceleration sensor 41 is removed reliably, and the calculation of the tilt angle based on the static component is made possible. The control unit 10 detects whether or not the main body 2 is in acceleration or deceleration in the fore and aft direction based on the change in the travel command signal, and therefore, prompt response is achieved and accuracy of the calculation of the tilt angle is improved.

A concrete embodiment of the present invention has been described in the foregoing, but the present invention is not limited to the embodiment and may be modified or altered in various ways. In the above embodiment, the roll angle of the main body 2 was used as the tilt angle calculated in the tilt angle calculation control, but in another embodiment, it is possible to use the pitch angle of the main body 2 and to perform the prohibition state monitoring control based on the pitch angle. Further, in another embodiment, the prohibition state monitoring control may be performed based on the roll angle and the pitch angle.

The determination of acceleration or deceleration of the main body 2 in the fore and aft direction in step S11 may be performed based on the values of the travel motor rotational angle sensors 35 and 36 instead of the value of the travel command signal.

Figure 7:
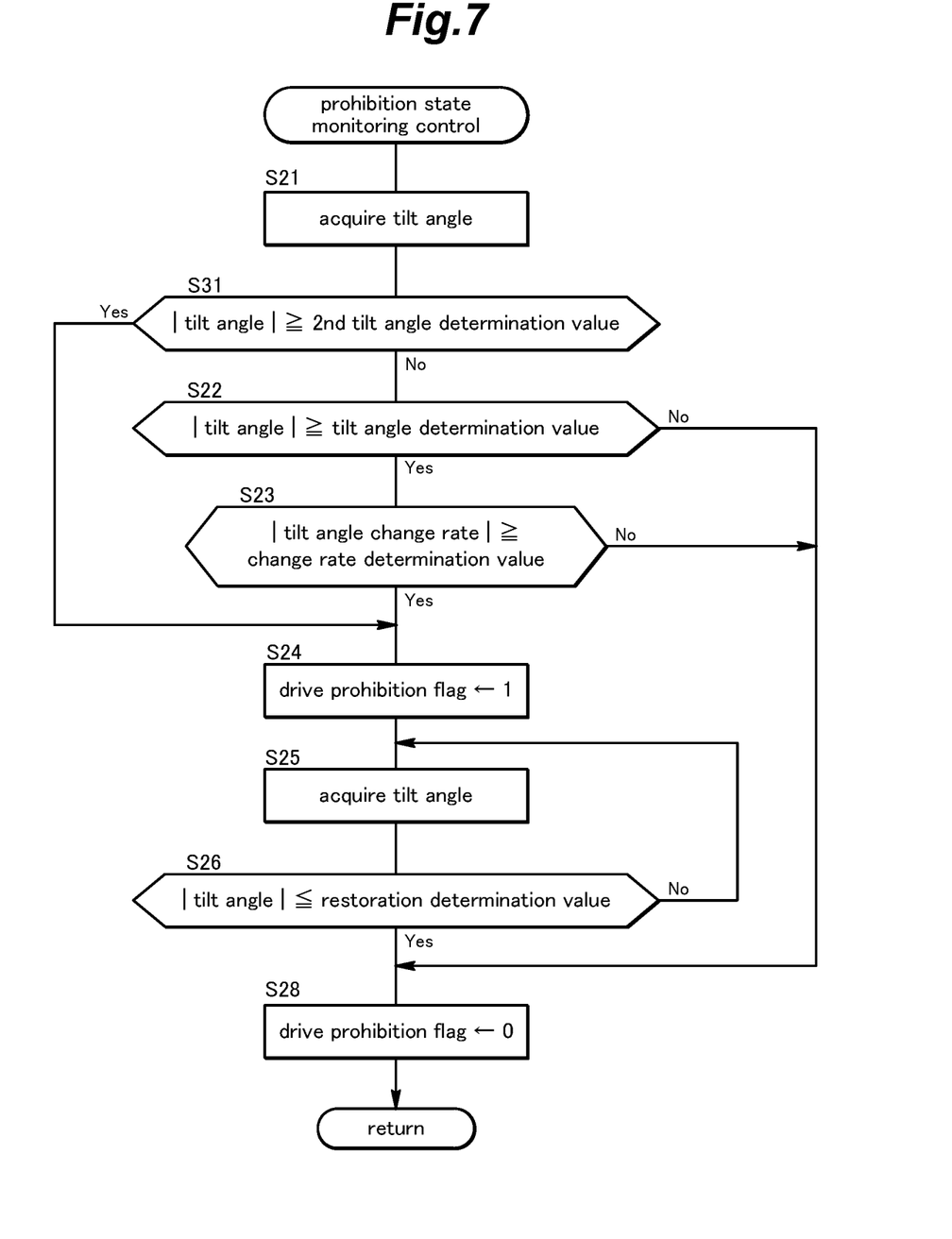
FIG. 7 is a flowchart showing a procedure of the prohibition state monitoring control performed by the control unit according to a partially modified embodiment.

Further, as in a partial modification of the prohibition state monitoring control shown in FIG. 7, the control unit 10 may additionally perform a process of assessing the tilt angle by using a second tilt angle determination value having a predetermined value greater than the tilt angle determination value, so as to set the drive prohibition flag to 1 when the absolute value of the tilt angle is greater than or equal to the second tilt angle determination value. Preferably, the process of determining whether or not the absolute value of the tilt angle is greater than or equal to the second tilt angle determination value (step S31) is provided between step S21 and step S22, such that if the determination result in step S31 is Yes, the control flow proceeds to step S24, and if No, the control flow proceeds to step S22. If the determination in step S31 finds that the absolute value of the tilt angle is greater than or equal to the second tilt angle determination value, the drive prohibition flag is set to 1 irrespective of the tilt angle and the change rate.

Further, as shown in FIG. 7, the process in step S27 of FIG. 6 may be omitted. In this case, the drive prohibition flag is set to 0 if the absolute value of the tilt angle becomes smaller than or equal to the restoration determination value in step S26, irrespective of whether the restoration operation has been performed.

In the present embodiment, configuration was made such that when the drive prohibition flag is 1, all the work motor 8 and the travel motors 9L and 9R are stopped in step S6, but in another embodiment at least one of the work motor 8 and the travel motors 9L and 9R is stopped in step S6.

In the foregoing embodiment, the present invention was exemplarily applied to the lawn mower, but the present invention can be similarly applied to a grass cutter, a snow blower, and a tiller. In the case of a grass cutter, the blade 3A should be replaced with a blade suitable for grass cutting, in the case of a snow blower, the blade 3A should be replaced with an auger suitable for snow removal, and in the case of a tiller, the blade 3A should be replaced with a tiller blade suitable for tilling.

GLOSSARY

1 electric lawn mower
2 main body
3 work unit
3A blade
4 front wheels
5 rear wheels
8 work motor
9L left travel motor
9R right travel motor
10 control unit
14 operation input unit
15 travel lever
16 work lever
20 battery
31 work motor driver
32 left travel motor driver
33 right travel motor driver
34 work motor rotational angle sensor
35 left travel motor rotational angle sensor
36 right travel motor rotational angle sensor
41 acceleration sensor
42 travel speed input unit
43 blade rotational speed input unit

The invention claimed is:

1. Power equipment, comprising:
a main body;
a work unit provided on the main body;
a work motor that drives the work unit;
a tilt angle detector that detects a tilt angle of the main body;
a control unit that drive-controls the work motor;
a travel motor that drives a wheel provided on the main body; and
an operation inputter that inputs a signal corresponding to an operation by an operator to the control unit,
wherein the control unit performs prohibition control that prohibits driving of the work motor when the tilt angle becomes greater than or equal to a predetermined tilt angle determination value and a change rate of the tilt angle becomes greater than or equal to a predetermined change rate determination value,
the tilt angle detector is an acceleration sensor that outputs a signal corresponding to an acceleration,
the control unit performs low-pass filtering process on the signal from the acceleration sensor to remove at least a portion of the signal corresponding to a dynamic component of the acceleration, and calculates the tilt angle based on the signal that has been subjected to the filtering process, and
the control unit drive-controls the travel motor according to the signal from the operation inputter, and changes a filter used in the low-pass filtering process according to the signal from the operation inputter.

2. The power equipment according to claim 1, wherein the control unit increases a removal ratio of a high-frequency component of the signal from the acceleration sensor by changing the filter when acceleration or deceleration of the travel motor is determined based on the signal from the operation inputter.

3. The power equipment according to claim 1, wherein the control unit terminates the prohibition control and permits driving of the work motor when the tilt angle becomes smaller than or equal to a restoration determination value that is set to a predetermined value smaller than or equal to the tilt angle determination value.

4. Power equipment, comprising:
a main body;
a work unit provided on the main body;
a work motor that drives the work unit;
a tilt angle detector that detects a tilt angle of the main body;
a control unit that drive-controls the work motor; and
a restoration operation inputter that inputs a signal corresponding to an operation by an operator to the control unit,
wherein the control unit performs prohibition control that prohibits driving of the work motor when the tilt angle becomes greater than or equal to a predetermined tilt angle determination value and a change rate of the tilt angle becomes greater than or equal to a predetermined change rate determination value, and
the control unit terminates the prohibition control and permits driving of the work motor when the control unit receives a signal from the restoration operation inputter during the prohibition control.

5. Power equipment, comprising:
a main body;
a work unit provided on the main body;
a work motor that drives the work unit;
a tilt angle detector that detects a tilt angle of the main body;
a control unit that drive-controls the work motor; and
a restoration operation inputter that inputs a signal corresponding to an operation by an operator to the control unit,
wherein the control unit performs prohibition control that prohibits driving of the work motor when the tilt angle becomes greater than or equal to a predetermined tilt angle determination value and a change rate of the tilt angle becomes greater than or equal to a predetermined change rate determination value, and
the control unit terminates the prohibition control and permits driving of the work motor when the tilt angle becomes smaller than or equal to a restoration determination value that is set to a predetermined value smaller than or equal to the tilt angle determination value and the control unit receives a signal from the restoration operation inputter during the prohibition control.

6. The power equipment according to claim 1, wherein the control unit performs the prohibition control when the tilt angle becomes greater than or equal to a second tilt angle determination value that is set to a predetermined value greater than the tilt angle determination value.

7. The power equipment according to claim 1, wherein the work unit includes a lawn mowing blade rotated by the work motor.

* * * * *